US012254090B2

(12) United States Patent
Dubey et al.

(10) Patent No.: US 12,254,090 B2
(45) Date of Patent: Mar. 18, 2025

(54) FILESYSTEM OBJECT PROTECTION FROM RANSOMWARE ATTACKS

(71) Applicant: INTERNATIONAL BUSINESS MACHINES CORPORATION, Armonk, NY (US)

(72) Inventors: Niteesh Kumar Dubey, Yorktown Heights, NY (US); Ramanjaneya Sarma Burugula, Yorktown Heights, NY (US); Joefon Jann, Ossining, NY (US); Ching-Farn Eric Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 17/445,963

(22) Filed: Aug. 26, 2021

(65) Prior Publication Data
US 2023/0060606 A1 Mar. 2, 2023

(51) Int. Cl.
*G06F 21/00* (2013.01)
*G06F 11/07* (2006.01)
(Continued)

(52) U.S. Cl.
CPC .......... *G06F 21/568* (2013.01); *G06F 11/076* (2013.01); *G06F 11/1469* (2013.01);
(Continued)

(58) Field of Classification Search
None
See application file for complete search history.

(56) References Cited

U.S. PATENT DOCUMENTS 9,514,309 B1 * 12/2016 Mann .................... G06F 21/567
10,387,648 B2 8/2019 Hirschberg
(Continued)

FOREIGN PATENT DOCUMENTS

| CN | 103955438 A | 7/2014 |
| CN | 112287346 A | 1/2021 |

(Continued)

OTHER PUBLICATIONS

S. Baek, Y. Jung, A. Mohaisen, S. Lee and D. Nyang, "SSD-Insider: Internal Defense of Solid-State Drive against Ransomware with Perfect Data Recovery," 2018 IEEE 38th International Conference on Distributed Computing Systems (ICDCS), Vienna, Austria, 2018, pp. 875-884, doi: 10.1109/ICDCS.2018.00089. (Year: 2018).*

(Continued)

*Primary Examiner* — Jeffery L Williams
(74) *Attorney, Agent, or Firm* — Kimberly Zillig

(57) ABSTRACT

A method, a computer program product, and a system for mitigating unauthorized encryptions of filesystem objects stored on a computing system. The method includes allocating a backup memory area for storing pre-encrypted filesystem objects, setting data bits in an encryption register that allow for monitoring a filesystem object marked for ransomware protection. The method also includes calculating an encryption rate of an encryption occurring on the filesystem object and determining that the encryption rate of the filesystem object exceeds an encryption-rate threshold. The encryption-rate threshold can be set by an administrator when marking the filesystem object for ransomware protection. The method further includes generating an alert to an administrator that the encryption rate of the filesystem object exceeds the encryption rate threshold and storing a backup of the filesystem object for a predetermined amount of time in the backup memory area.

20 Claims, 8 Drawing Sheets

(51) Int. Cl.
  *G06F 11/14* (2006.01)
  *G06F 21/55* (2013.01)
  *G06F 21/56* (2013.01)
  *G06F 21/60* (2013.01)

(52) U.S. Cl.
  CPC .......... *G06F 21/554* (2013.01); *G06F 21/565* (2013.01); *G06F 21/602* (2013.01)

(56) References Cited

U.S. PATENT DOCUMENTS

| | | | |
|---|---|---|---|
| 10,438,000 | B1 | 10/2019 | Gu |
| 10,454,903 | B2 | 10/2019 | Neal |
| 10,599,838 | B2* | 3/2020 | Schoenherr ......... G06F 21/6209 |
| 10,609,066 | B1 | 3/2020 | Nossik |
| 10,623,438 | B2 | 4/2020 | Sambandam |
| 10,733,290 | B2* | 8/2020 | Berler .................. G06F 21/566 |
| 10,783,043 | B2 | 9/2020 | O'Mahony |
| 10,795,994 | B2 | 10/2020 | Mehta et al. |
| 10,831,893 | B2* | 11/2020 | Schmugar ............. G06F 21/566 |
| 10,958,720 | B2 | 3/2021 | Savino |
| 10,979,449 | B2 | 4/2021 | Humphries |
| 11,586,734 | B2* | 2/2023 | Horspool ............ H04L 63/0428 |
| 11,954,337 | B2* | 4/2024 | Burugula ............. G06F 3/0619 |
| 2011/0004738 | A1 | 1/2011 | Yasaki et al. |
| 2011/0173409 | A1 | 7/2011 | Sibert |
| 2014/0096235 | A1 | 4/2014 | Fryman et al. |
| 2017/0277898 | A1 | 9/2017 | Powell et al. |
| 2018/0018458 | A1* | 1/2018 | Schmugar ............. G06F 21/554 |
| 2018/0248896 | A1 | 8/2018 | Challita |
| 2018/0307435 | A1 | 10/2018 | Van Riel et al. |
| 2018/0324214 | A1* | 11/2018 | Schoenherr ........... G06F 21/552 |
| 2019/0108340 | A1 | 4/2019 | Bedhapudi et al. |
| 2019/0114438 | A1 | 4/2019 | Hersans |
| 2019/0347418 | A1* | 11/2019 | Strogov .................. G06F 21/44 |
| 2020/0051071 | A1 | 2/2020 | Wu et al. |
| 2020/0092728 | A1 | 3/2020 | Van Duyne et al. |
| 2020/0128027 | A1 | 4/2020 | Hittel |
| 2020/0387609 | A1 | 12/2020 | Hansen |
| 2021/0019411 | A1* | 1/2021 | Schmugar ............. G06F 21/554 |
| 2021/0049272 | A1* | 2/2021 | Mueller-Wicke ..... G06F 21/554 |
| 2021/0203504 | A1 | 7/2021 | Brandt |
| 2021/0232685 | A1* | 7/2021 | Kraemer ............... G06F 21/566 |
| 2021/0255962 | A1 | 8/2021 | Zmudzinski et al. |
| 2021/0271757 | A1* | 9/2021 | Horspool ............. G06F 21/554 |
| 2021/0334372 | A1* | 10/2021 | Hansen ................. G06F 21/552 |
| 2022/0060498 | A1* | 2/2022 | Head, Jr. ............. H04L 12/4633 |
| 2022/0222345 | A1* | 7/2022 | Mueller-Wicke ..... H04L 63/145 |
| 2022/0269807 | A1* | 8/2022 | Gehtman ................ G06F 21/78 |
| 2023/0023584 | A1* | 1/2023 | Sternfeld ............ G06F 21/6218 |
| 2023/0060606 | A1* | 3/2023 | Dubey .................. G06F 11/076 |
| 2023/0063792 | A1* | 3/2023 | Burugula ............. G06F 3/0659 |

FOREIGN PATENT DOCUMENTS

| | | |
|---|---|---|
| EP | 3629540 A1 | 4/2020 |
| WO | 2007050797 A2 | 5/2007 |
| WO | 20181568001 W | 8/2018 |

OTHER PUBLICATIONS

Sternfeld, "Systems and Methods for Ransomware Detection", U.S. Appl. No. 63/203,505, filed Jul. 2021. (Year: 2021).*

"Asymmetrically Encrypted Filesystems for Data Backup, Confidentiality, Disaster Recovery Restoration," Published May 3, 2006, IPCOM000136042D, https://priorart.ip.com/IPCOM/000136042.

"COHESITY: Counter Ransomware Attacks with Cohesity," https://www.cohesity.com/resource-assets/solution-brief/Counter-Ransomware-Attacks-with-Cohesity.pdf.

"Ensuring the accessibility of the system for disaster recovery without downtime," Published Apr. 13, 2016, IPCOM000245837D, https://priorart.ip.com/IPCOM/000245837.

"Inline cyber resiliency for async replication in a three-site replication," published Nov. 8, 2019, IPCOM000260259D, https://priorart.ip.com/IPCOM/000260259.

"Methodology for Optimizing Clustered Filesystem Asynchronous Replication Suited for Cyber Resiliency," published Sep. 7, 2020, IPCOM000263515D, https://priorart.ip.com/IPCOM/000263515.

"Pure FlashBlade with Commvault for Data Protection," Published Dec. 2020, https://whitepapers.theregister.com/paper/view/10332/pure-flashblade-with-commvault-for-data-protection.

D. Min et al., "Amoeba: An Autonomous Backup and Recovery SSD for Ransomware Attack Defense," in IEEE Computer Architecture Letters, vol. 17, No. 2, pp. 245-248, Jul. 1-Dec. 2018, doi: 10.1109/LCA.2018.2883431.

E. Berrueta, D. Morato, E. Magana and M. Izal, "A Survey on Detection Techniques for Cryptographic Ransomware," In IEEE Access, vol. 7, pp. 144925-144944, 2019, doi: 10.1109/ACCESS.2019.2945839. https://ieeexplore.ieee.org/stamp/stamp.jsp?tp=&arnumber=8861029.

FBI Flash: Latest Tactics, Techniques, and Procedures Associated with Ryuk Ransomware and Recommended Mitigation, https://iacc.memberclicks.net/assets/docs/COVID19/RYUK_FBI_FLASH_FINAL.PDF.

Jian Huang, Jun Xu, Xinyu Xing, Peng Liu, and Moinuddin K. Qureshi. 2017. FlashGuard: Leveraging Intrinsic Flash Properties to Defend Against Encryption Ransomware. In <i>Proceedings of the 2017 ACM SIGSAC Conference on Computer and Communications Security</i> (<i>CCS '17</i>). Association for Computing Machinery, New York, NY, USA, 2231-2244. DOI:https://doi.org/10.1145/3133956.3134035.

Kok, S.H.; Abdullah, A.; Jhanjhi, N.; Supramaniam, M. Prevention of Crypto-Ransomware Using a Pre-Encryption Detection Algorithm. Computers 2019, 8, 79. https://doi.org/10.3390/computers8040079.

List of IBM Patents or Patent Applications Treated as Related, 2 pages.

S. Kumar Sen, N. Chourey, "A Study of Ransomware Detection and Prevention at Organizations", International Research Journal of Engineering and Technology, Jul. 2020, https://www.irjet.net/archives/V7/i7/IRJET-V717810.pdf.

S. Mahmudha Fasheem, P. Kanimozhi, and B. AkoraMurthy, "Detection and Avoidance of Ransomware", International Journal of Engineering Development and Research, vol. 5, Issue 1, 2017, https://www.ijedr.org/papers/IJEDR1701090.pdf.

PCT/EP2022/070596 International Search Report and Written Opinion mailed Oct. 25, 2022, 11 pgs.

PCT/IB2022/057056 International Search Report and Written Opinion mailed Oct. 26, 2022, 9 pgs.

* cited by examiner

| Encryption Monitor Bit 410 | Encryption Status Bit 420 | Virtual Page # 430 | Physical Frame # 440-1 | |
|---|---|---|---|---|
| ... | ... | ... | ... | ... |
| ... | ... | ... | ... | ... |

FIG. 4

FILESYSTEM OBJECT PROTECTION FROM RANSOMWARE ATTACKS

BACKGROUND

The present disclosure relates to filesystem object protection, and more specifically, to filesystem object protection from unauthorized encryptions.

Ransomware is a kind of malware that can prevent users from accessing their computing device resources and/or personal data using various methods. Typically, when a system is affected by a ransomware attack, the computing device will display a ransom note and provide a way to pay the ransom. The data on the computing device (e.g., a computer, server, tablet, smartphone, Internet of Things (IoT) device) becomes unusable until the device owner pays a ransom to remove the restriction. The perpetrators behind the ransomware can collect ransom money using anonymous payment methods (e.g., prepaid cash cards, cryptocurrencies) to limit any potential money trails.

Malware, or malicious software, can describe all types of software programs that can bring damage or steal data from a target computing device. Most malware types require execution or some type of triggering event by the user to execute their malicious code and spread to other computers and networks. Malware infections can either manually (physically) through the use of items such as floppy disks, CD/DVDs, and USB sticks and other removable media, or they can be delivered through a network (e.g., the Internet, intranet, e-mail attachments, pirated software, social networks).

SUMMARY

Embodiments of the present disclosure include a computer-implemented method of detecting and mitigating unauthorized encryptions, such as from ransomware attacks. The computer-implemented method includes monitoring a filesystem object marked for encryption protection. The filesystem object can be marked using the page table entry encryption monitor bits in the hardware page table corresponding to the memory pages of the object. The computer-implemented method also includes detecting an encryption occurring to the filesystem object and storing a pre-encrypted backup of the filesystem object. The computer-implemented method also includes calculating an encryption rate of the encryption occurring on the filesystem object and determining that the encryption rate of the filesystem object exceeds an encryption-rate threshold. The encryption-rate threshold can be set by an administrator when marking the filesystem object for ransomware protection. The computer-implemented method further includes generating an alert to an administrator that the encryption rate of the filesystem object exceeds the encryption rate threshold. The computer-implemented method also includes receiving a feedback response indicating that the encryption is unauthorized and performing mitigation techniques on the filesystem object.

Additional embodiments of the present disclosure include a computer program product of detecting and mitigating unauthorized encryptions, one or more computer-readable storage medium, and program instructions stored on the one or more computer-readable storage media, the program instruction executable by a processor to cause the processor to perform a method. The method includes monitoring a filesystem object marked for encryption protection. The filesystem object can be marked using the page table entry encryption monitor bits in the hardware page table corresponding to the memory pages of the object. The method also includes detecting an encryption occurring to the filesystem object and storing a pre-encrypted backup of the filesystem object. The method also includes calculating an encryption rate of the encryption occurring on the filesystem object and determining that the encryption rate of the filesystem object exceeds an encryption-rate threshold. The encryption-rate threshold can be set by an administrator when marking the filesystem object for ransomware protection. The method further includes generating an alert to an administrator that the encryption rate of the filesystem object exceeds the encryption rate threshold. The method also includes receiving a feedback response indicating that the encryption is unauthorized and performing mitigation techniques on the filesystem object.

Further embodiments of the present disclosure include a system for detecting and mitigating unauthorized encryptions. The system includes a memory, a processor, local data storage having stored thereon computer-executable code. The computer-executable code includes the program instruction executable by a processor to cause the processor to perform the method described above. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

FIG. 4 is a block diagram illustrating a hardware page table used by one or more embodiments of the present disclosure.

Figure 1:
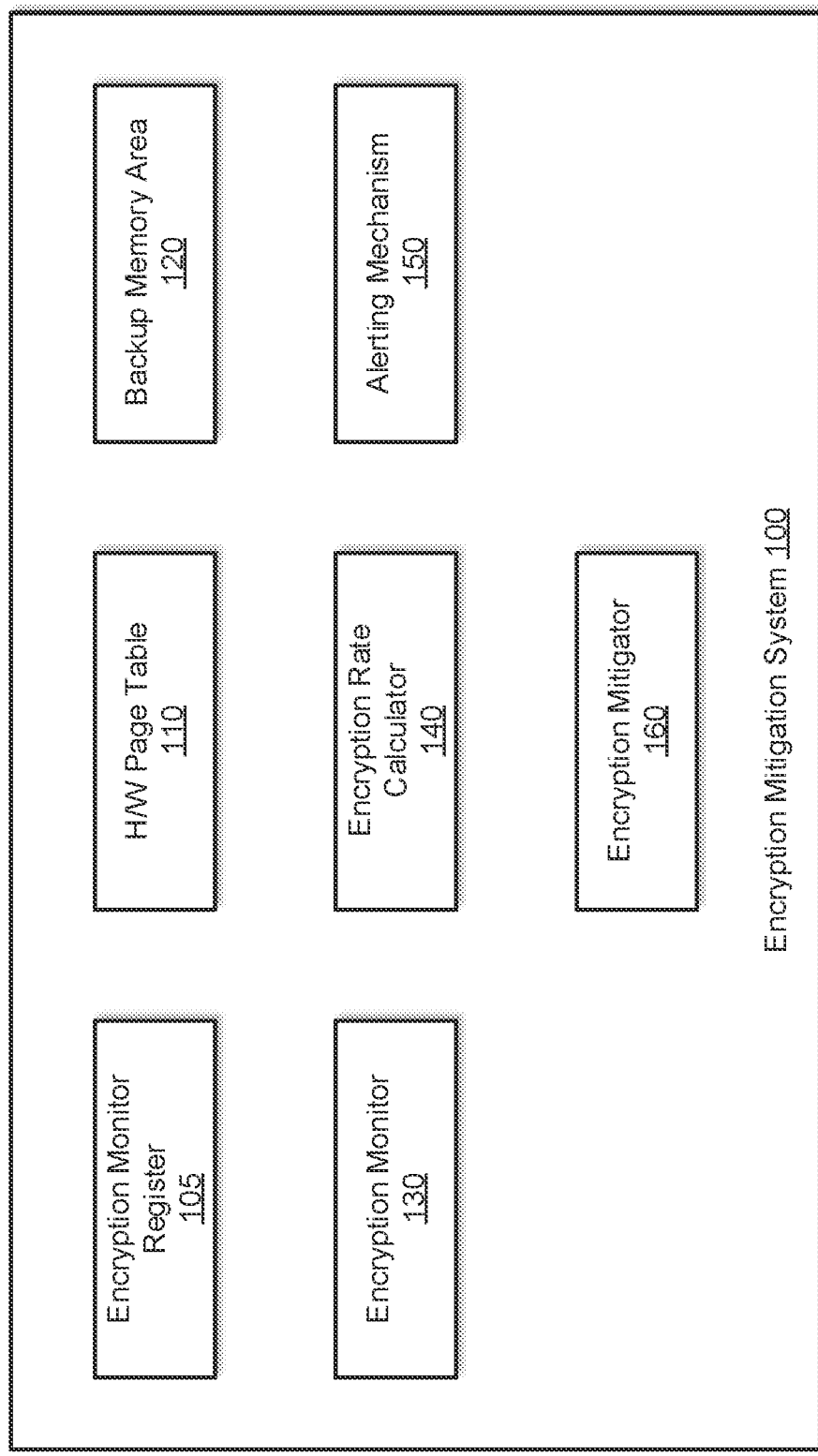
FIG. 1 is a block diagram illustrating an encryption mitigation system used by one or more embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within

DETAILED DESCRIPTION

The present disclosure relates to filesystem object protection, and more specifically, to filesystem object protection from unauthorized encryptions, such as those from ransomware attacks. While the present disclosure is not necessarily limited to such applications, various aspects of the disclosure may be appreciated through a discussion of various examples using this context.

There are two main types of ransomware techniques that are employed. These types are locker and crypto ransomware. Locker ransomware works by preventing users from reaching their personal files by denying them access to certain computing resources (e.g., locking the desktop or preventing a log in) and then demanding a ransom to regain access. Typically, these types of attacks can be overcome by technical users with relative ease.

Crypto ransomware encrypts data stored on a target machine, preventing a user from accessing that data. The attacker keeps the data encrypted until the user pays the ransom and obtains the key from the attacker. In order to incentivize users to pay the ransom, some attackers may progressively delete files or release them to the public if the user fails to pay the ransom within a certain time frame.

Various techniques are used to protect against ransomware attacks. Typically, corporations and governments deploy firewalls within a network to isolate trusted networks holding enterprise data and applications securely to avoid the risk of a ransomware attack. However, most enterprises and government agencies allow employees remote access into their internal network. This makes securing networks using firewalls difficult and susceptible to attacks as intruders can surpass the defenses by infecting endpoint devices directly. Other common protection techniques include patch management, physical security of digital assets, network segmentation, anti-ransomware products, utilization of least-privilege accounts, vulnerability scanning tools, intrusion detection/prevention systems, and the like.

Intrusion detection systems (IDS) and intrusion prevention systems (IPS) can be hardware devices with software components or as software applications. Both IDSs and IPSs can scan network traffic for signatures that match a database of known cyberattack signatures. Typically, IDSs are either network-based or host-based. Network-based IDSs can monitor network traffic, while a host-based IDS can be installed on an end device and actively monitor the state of a system (e.g., file integrity checks, log analysis, process monitoring, Windows registry monitoring, detecting malicious software, etc.) and the network traffic passing through its network interfaces. Once an attack is detected, the IDS can send a notification so that another system, or administrator, can perform preventative actions such as closing the attack entry point or reconfiguring the firewall.

IPSs operate similarly to an IDS in monitoring network traffic but will respond differently when suspicious activity is detected. IPSs can use deep packet inspection to proactively monitor network traffic for suspicious activity and take preventative action automatically to deter the attack. IPSs can act as control systems that prevent and allow packet delivery using a predefined policy.

Limitations on ransomware protection remain, however, as current techniques rely on cyberattack signature databases containing known attack patterns and protocol anomalies. The cyberattack signature databases require that they be updated periodically to prevent newly discovered cyberthreats from intruding a system. Thus, available ransomware protection do not protect against new ransomware cyberattacks as those attacks will not have known attack patterns. Additionally, a system can become vulnerable if any of the additional security functions (e.g., antivirus, web filtering, content filtering, data leak prevention, firewalls, etc.) becomes compromised or fails to update in a timely manner.

Embodiments of the present disclosure may overcome the above, and other problems, by using an encryption mitigation system that utilizes an encryption register to monitor for hardware-based encryptions occurring to pages of an operating system or hypervisor. Additionally, encryption monitor bits can be added to page table entries in the address translation of a program address (i.e., virtual address or effective address) that can be set to assist in monitoring for encryption. The encryption mitigation system can set these bits in a page table to mark filesystem objects so that they can be monitored for encryption activity. A backup memory area can be allocated and initialized to store pre-encrypted backups of the filesystem objects being monitored and can be only accessible by trusted and secure software in the system. If an encryption is detected, the encryption mitigation system can calculate an encryption-rate of the filesystem objects being encrypted. A pre-encrypted backup of the filesystem object can be placed in the back up memory area and a determination can be made as to whether the encryption rate exceeds a predetermined encryption-rate threshold. If so, the ransomware attack mitigator can alert an administrator and take preventative actions to stop the ransomware from encrypting any other data.

More specifically, the encryption mitigation system can scan encryption status bits of page tables entries relating to filesystem objects marked for encryption monitoring. The encryption status bits can indicate whether a part, or all, of the filesystem object has been encrypted. A pre-encrypted back up of the filesystem object can be placed into the backup memory area upon detection that an encryption status bit has changed. An encryption rate of the encryption can be calculated. If the rate exceeds a predetermined threshold, then mitigations actions can take place to prevent the ransomware from encrypting any other data.

In some embodiments, the backup memory area includes a metadata region and a data region. The metadata region can include information such as the size of the backup memory area, a size of the available space in the backup memory area, a starting address of the available space in the backup memory area, and a hash table. The hash table can contain a mapping between physical page numbers and backup memory locations relating to data between stored in the backup memory area. The backup memory area can be configured by an administrator that can set the initial size of the area and additional security restrictions to the area. For example, the backup memory area can be configured such that the area is only accessible by trusted software in the system.

In some embodiments, whenever a filesystem object is marked, or registered, for monitoring, additional information can be provided for when an unauthorized encryption occurs. The additional information includes, but is not limited to, instructions on how to inform an administrator when an encryption is detected (e.g., alert notification, email, instant message, etc.), an encryption-rate threshold, and a retention-time-period for retaining pre-encrypted data in the backup memory area. In some embodiments, the encryption-rate threshold is defined as the maximum value of the encryption-rates of the set of monitored filesystem objects. An encryption rate can be the number of encryptions performed by encryption devices (e.g., using hardware features like processor instructions, encryption accelerators, and/or known encryption libraries of the system software) over a given time interval (e.g., one second, thirty second, two minutes). In some embodiments, a page encryption rate is used in addition to, or as an alternative to, the encryption rate. The page encryption rate can measure the number of pages (either part of a page or a full page) that are encrypted over the given time interval.

In some embodiments, a feedback response is provided after an alert of an unauthorized encryption. The feedback response can indicate whether or not the encryption was authorized or should be treated as unauthorized. Additional information can be provided within the feedback response as to additional steps that can be taken to mitigate further encryption activity. For example, the feedback response may indicate that all current encryption progress be stopped and that any encrypted filesystem objects be replaced with their pre-encrypted versions.

In some embodiments, the backup memory area is governed by a retention period policy. The retention period policy can dictate how long pre-encrypted data is stored on the data region of the backup memory area before being deleted. This prevents data from being stored in the backup memory area unnecessarily and helps to ensure that the backup memory area has available space when needed. For example, the retention period policy may indicate that data can only be stored for four days. After the four-day period, any data stored for that amount of time is removed, thereby clearing space for other data.

FIG. 1 illustrates an encryption mitigation system 100 configured to detect and mitigate unauthorized encryptions such as from ransomware attacks, in accordance with embodiments of the present disclosure. The encryption mitigation system 100 includes an encryption monitor register 105, a hardware page table 110, a backup memory area 120, an encryption monitor 130, an encryption rate calculator 140, an alerting mechanism 150, and an encryption mitigator 160. Additional details of the encryption monitor register 105 are presented in FIG. 2, additional details of the hardware page table 110 are presented in FIG. 4, and additional details of the backup memory area 120 are presented in FIG. 3.

The encryption monitor register 105 is a component of the encryption mitigation system 100 configured to monitor for encryption of pages of an operating system or hypervisor. Additional description of the encryption monitor register 105 is presented in FIG. 2.

The hardware page table 110 is a component of the encryption mitigation system 100 configured to store page table entries. Each page table entry in the hardware page table 110 can include an encryption monitor bit indicating whether the page belonging to the filesystem should be monitored for encryption or not. Each page table entry in the hardware page table 110 can also include an encryption status bit that can be marked when an encryption occurs to that page. Additional description of the hardware page table 110 is presented in FIG. 4.

The backup memory area 120 is a component of the encryption mitigation system 100 configured to store pre-encrypted data and additional information relating to encryption processes. The backup memory area 120 can include a metadata region and a data region. The metadata region can provide information such as the overall size and remaining space of the backup memory area 120. The data region can be reserved for pre-encrypted data that requires storing during an encryption event. Additional description of the backup memory area is presented in FIG. 3.

The encryption monitor 130 is a component of the encryption mitigation system 100 configured to monitor for encryption activity occurring on filesystem objects marked for monitoring. Filesystem objects marked for encryption monitoring are indicated for monitoring using the encryption monitor bit in the hardware page table 110. The page table entries for the marked filesystem objects can then be monitored by the encryption monitor 130 for any encryption activity. The encryption monitor 130 can continuously scan the hardware page table 110 for changes to the encryption status bits of the marked filesystem objects to determine whether an encryption has occurred.

In some embodiments, the encryption monitor 130 continuously scans the hardware page table 110 at a predetermined interval. The interval can be any predetermined interval set by an administrator. For example, the encryption monitor 130 can scan the hardware page table 110 every thirty seconds. The intervals can also be dependent on the resources available to the system. Scanning the hardware page table 110 can be set at an interval that minimizes the resources and performance of a system performing the action.

The encryption rate calculator 140 is a component of the encryption mitigation system 100 configured to calculate an encryption rate of an encryption detected by the encryption monitor 130. Typically, ransomware attacks attempt to encrypted large portions of data, while normal encryption habits may encrypt only a few filesystem objects at a time. As such, the more page table entries marked as being encrypted can be an indicator that a system is potentially under a ransomware attack. In some embodiments, the encryption rate calculator 140 determines the encryption rate by adding up the total number of page frames that were encrypted during a predetermined time period. That total can then be divided by a predetermined time. The predetermined time can be any amount of time set by an administrator upon initialization of the monitoring system. For example, the predetermined time can be five seconds, thirty second, one minute, and the like.

In some embodiments, the encryption rate calculator 140 determines the encryption rate using the hash table stored in the backup memory area 120. The hash table can include an encryption count for the filesystem objects marked for encryption monitoring. Whenever a filesystem object is encrypted, the encryption count for the corresponding physical page frame number can be incremented by the encryption hardware. If the encryption count bit is set to '1', then the encryption rate calculator 140 can take the values of the encryption count and divide by the predetermined time, similar to the technique describe above, and determine the encryption rate. If the encryption count bit is set to '0', the page encryption rate (i.e., the number of pages over a predetermined time) can be calculated by adding the number of physical page frames with a non-zero encryption count and dividing by the predetermined time.

The encryption rate calculator is further configured to determine whether the encryption rate exceeds a predetermined encryption-rate threshold. The encryption-rate threshold can be a predetermined encryption rate that the calculated encryption rate must either meet or exceed in order to trigger an alert. If the encryption rate does not exceed the encryption-rate threshold, then the ransomware mitigation system 100 can return to monitoring the marked filesystem objects. However, if the encryption rate exceeds the predetermined encryption-rate threshold, then an alert can be generated by the alerting mechanism 150.

The alerting mechanism 150 is a component of the encryption mitigation system 100 configured to generate an alert upon determining that the calculated encryption rate meets or exceeds the encryption rate threshold. The alerts include, but are not limited to, alert notifications, emails, instant messages, text messages, and broadcasts. The alerts can notify an administrator, or an automated system, that a potential unauthorized encryption is occurring on the system. The alert can include information regarding the encryption rate and the filesystem objects detected as being encrypted. Additional information, such as, time, location, and duration of the encryption can also be included within the alert.

The encryption mitigator 160 is a component of the encryption mitigation system 100 configured to perform mitigation techniques in response to receiving a feedback response indicating that an encryption of a filesystem object was unauthorized. The mitigation techniques include, but are not limited to, stopping any current encryption, removal of encrypted data, restoring of the encrypted filesystem objects, and resetting the hardware page table 110 and backup memory area 120.

The encryption mitigator 160 can analyze the filesystem objects that the hardware page table 110 has marked as encrypted and restore those filesystem objects. The encrypted, or partially encrypted, versions of the filesystem objects can be removed from the system and can be replaced with their corresponding pre-encrypted filesystem objects stored in the backup memory area 120. Additionally, the encryption mitigator 160 can go through the hardware page table 110 and examine the encryption status bits to determine which filesystem objects require replacement and reset those encryption status bits. Once the pre-encrypted filesystem objects have replaced the encrypted objects, the encryption mitigator 160 can clear the backup memory area 120 of those objects.

It is noted that FIG. 1 is intended to depict the major representative components of a encryption mitigation system 100. In some embodiments, however, individual components may have greater or lesser complexity than as represented in FIG. 1, components other than or in addition to those shown in FIG. 1 may be present, and the number, type, and configuration of such components may vary.

Figure 2:
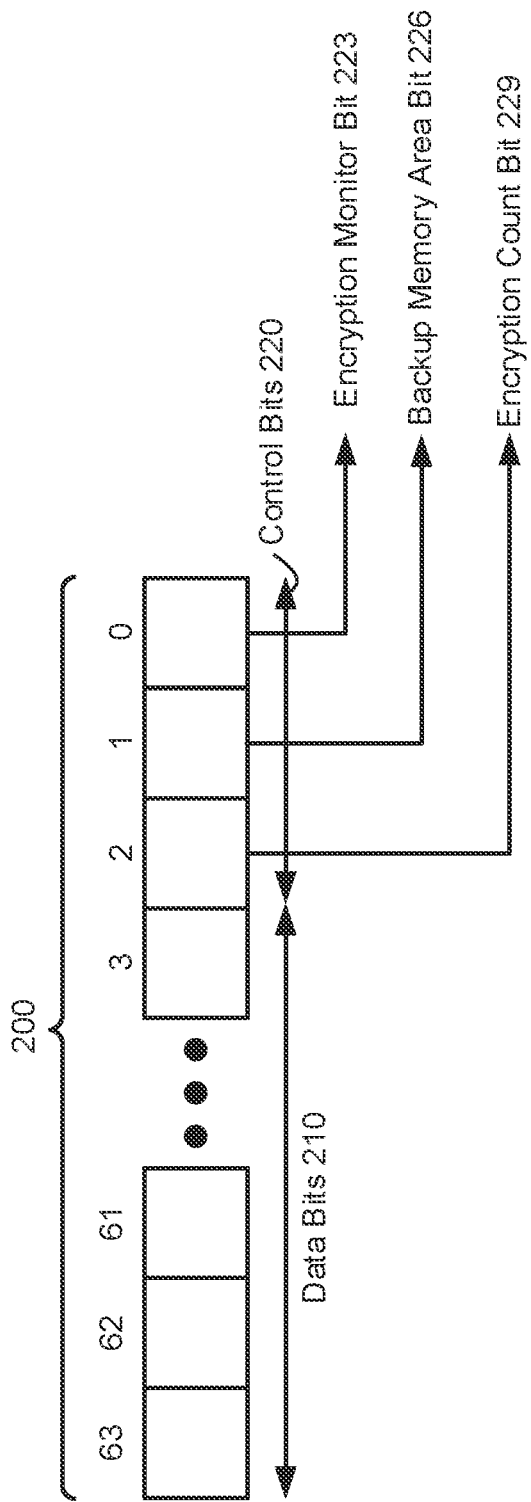
FIG. 2 is a block diagram illustrating an encryption monitor register used by one or more embodiments of the present disclosure.

FIG. 2 is a block diagram illustrating an encryption monitor register 200 (which can be the same as, or substantially similar to, the encryption monitor register 105 of FIG. 1), in accordance with embodiments of the present disclosure. The encryption monitor register 200 includes data bits 210 and controls bits 220. The control bits include an encryption monitor bit 223, a backup memory area bit 226, and an encryption count bit 229.

The data bits 210 are components of the encryption monitor register 200 configured to store and calculate the starting address of a backup memory area used to store pre-encrypted data. As an example, as shown, bits 3-63 are designated as the data bits 210. However, the data bits 210 can vary, based on the architecture and register used during implementation.

The control bits 220 are components of the encryption monitor register 200 configured to indicate encryption commands. The encryption monitor bit 223 can indicate whether encryption monitoring is enabled. For example, when the encryption monitor bit 223 is set '0', then encryption monitoring is not enabled. When the encryption monitor bit 223 is set to '1', then encryption monitoring is enabled. In some embodiments, the indicator bit is reversed, such that '0' indicates monitoring and '1' indicates no monitoring.

The backup memory area bit 226 can indicate whether the system should use the backup memory area indicated by the data bits 210. For example, when the backup memory area bit 226 is set '0', then the system does not utilize the backup memory. The bit can also indicate that a backup memory area is not established and not linked to the data bits 210. When the backup memory area bit 226 is set to '1', that indicates to the system to utilize the backup memory area pointed to by the data bits 210 when storing pre-encrypted data. In some embodiments, the indicator bit is reversed, such that '0' indicates to the system to utilize the backup memory area pointed to by the data bits 210 and '1' indicates not to utilize the backup memory area.

The PTE encryption count bit 229 can indicate the type of encryption count technique to use when determining an encryption speed. For example, a physical page frame 440 was encrypted ten times during a predetermined time. If the encryption count bit 229 is set to '0', then this page frame contributes the value '1' for the purpose of calculating the encryption rate. If the encryption count bit 229 is set to '1', then this page frame contributes the value '10' for the purpose of calculating the encryption rate.

It is noted that FIG. 2 is intended to depict the major representative components of an encryption monitor register 200. In some embodiments, however, individual components may have greater or lesser complexity than as represented in FIG. 2, components other than or in addition to those shown in FIG. 2 may be present, and the number, type, and configuration of such components may vary.

Figure 3:
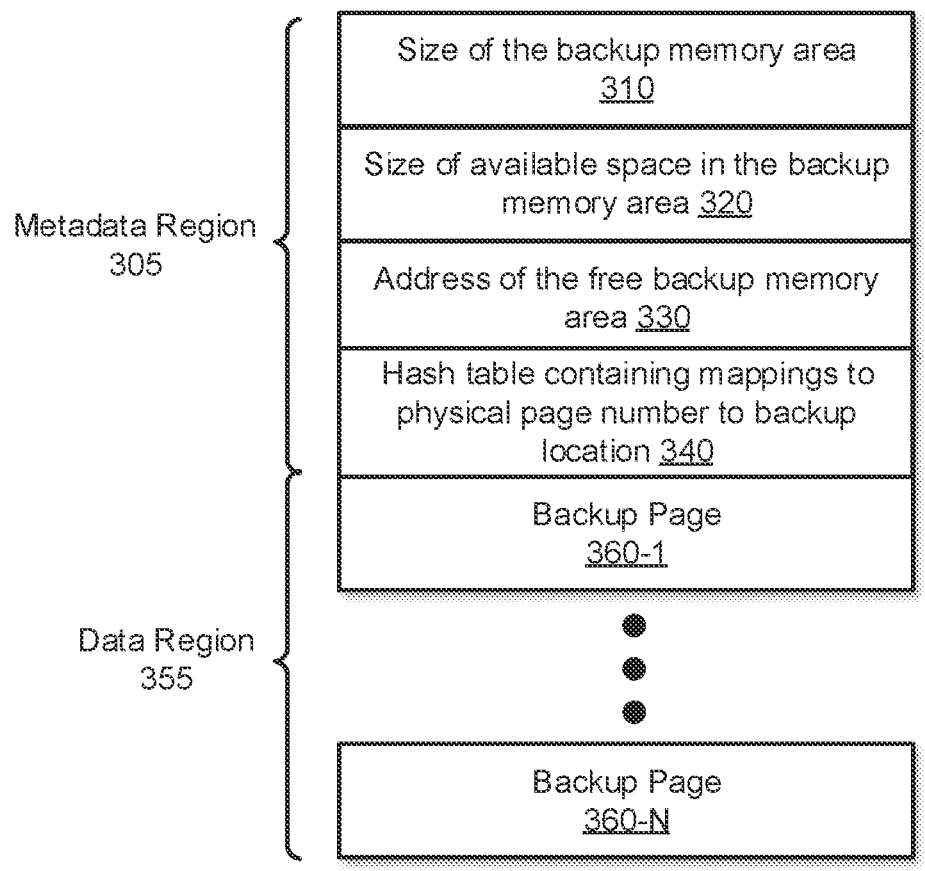
FIG. 3 is a block diagram illustrating a backup memory area used by one or more embodiments of the present disclosure.

FIG. 3 is a block diagram illustrating a backup memory area 300 (which can be the same as, or substantially similar to, the backup memory area 120 of FIG. 1) configured to store pre-encrypted data and provide additional information relating to encryption processes, in accordance with embodiments of the present disclosure. The backup memory area 300 includes a metadata region 305 and a data region 355. The metadata region 305 includes a total size 310 of the backup memory area, a size of available space 320 in the backup memory area, a starting address 330 of the free backup memory area, and a hash table 340. The data region 355 includes a backup page 360-1 and a backup page 360-N (collectively "backup pages 360") where N is a variable integer representing any number of possible backup pages 360.

The backup memory area 300 can be a predetermined size based on the number of filesystem objects being monitored for encryption. In some embodiments, the backup memory area 300 is set to the same size as the total number of encryption file objects being monitored. For example, if the size of the filesystem objects being monitored is two gigabytes, then the backup memory area 300 can be set such that the pre-encrypted versions of those files can all be stored in the backup memory area 300 at the same time. This prevents issues that may arise when the backup memory area 300 lacks the necessary space to store the pre-encrypted data. In some embodiments, the total size 310 of the backup memory area 300 is adjusted dynamically. For example, if the available space 320 of the backup memory area 300 reaches a predetermined percentage threshold (e.g., 50%, 60%, 90%), then the total size 310 can be increased to accommodate for additional pre-encrypted data without risking the backup memory area 300 running out of available space.

In some embodiments, alleviations measures are performed on the backup memory area 300 when the data region 355 lacks space to store a pre-encrypted filesystem object. The alleviation measures include, for example, removing pre-encrypted objects stored in the data region 355 beyond their retention period and allocation additional memory to the backup memory area 300. The alleviation measures can be implemented when a determination is made that the backup memory area 300 is unable to store a pre-encrypted backup of a filesystem object. A notice can be can generated that instructs the system that an alleviation measure is required.

In some embodiments, the backup memory area 300 can only be accessed by certain software. For example, access restrictions can be set on the backup memory area 300 such that only trusted software given access to the backup memory area 300 can access the stored pre-encrypted data. By do so, the backup memory area 300 becomes less susceptible to falling victim to the ransomware attack that it seeks to prevent. The trusted software can be set at initialization and can be limited to software that cannot be accessed by potential attackers.

When storing pre-encrypted data into the data region 355, the software can refer to the starting address of the free space 330 and determine whether the pre-encrypted data can be stored within the remaining available space 320. If the there is available space 320, then the pre-encrypted data is stored. However, if there is not enough space available to store the pre-encrypted data, then a hardware interrupt can be initiated to inform the software that the backup memory area 300 lacks space and that a remediation technique needs to be employed.

The hash table 340 can store information relating to the pre-encrypted data stored in the data region 355 of the backup memory area 300. For each object stored in the data region 355, a key and a value can be set. The key can represent a page frame number for an object and a value representing backup memory location of the object. Additionally, the value can include an encryption count. The encryption count can be used by the encryption monitor register 200 in addition to, or in place of, the PTE encryption status bit 410 when determining an encryption speed. Whenever an encryption occurs to a virtual page of an object marked for monitoring, the encryption count is incremented for that object in the hash table.

It is noted that FIG. 3 is intended to depict the major representative components of a backup memory area 300. In some embodiments, however, individual components may have greater or lesser complexity than as represented in FIG. 3, components other than or in addition to those shown in FIG. 3 may be present, and the number, type, and configuration of such components may vary.

FIG. 4 is a block diagram illustrating a hardware page table 400 (which can be the same as, or substantially similar to, the hardware page table 110 of FIG. 1) for use by a virtual memory system to store a mapping between virtual addresses and physical addresses, in accordance with embodiments of the present disclosure. The hardware page table 400 includes a page encryption monitor bit 410, a page encryption status bit 410, a virtual page number 430, and a physical frame number 440. The hardware page table 400 can also include additional information regarding each hardware page frame.

The page encryption monitor bit 410 is a component of the hardware page table 400 configured to indicate to the hardware that a page requires monitoring for encryption. Whenever a filesystem object is marked for encryption monitoring, its corresponding page table entries in the hardware page table 400 can also be marked for encryption monitoring. This can be done by setting the encryption monitor bits 410 to '1' to indicate the monitoring of those pages. The pages of filesystem objects that are not monitored can maintain their encryption monitor bits 410 at '0'.

The page encryption status bit 410 is a component of the hardware page table 400 configured to indicate to the system software that an encryption was performed on a page. Additionally, the page encryption status bit 410 can also indicate that the corresponding pre-encrypted data was copied to the backup memory area 300 if the page encryption monitor bit 410 is set for monitoring. When the page encryption status bit 410 is set to '1' can indicate to the system software that an encryption to the data relating to that page entry has occurred. The page encryption status bit 410 is set to '0' can indicate that no encryption has occurred. In some embodiments, the bit indication is reversed, such that '0' indicates to the system software that an encryption has occurred on the data relating to the page table entry and '1' indicates that no encryption has occurred.

The hardware page table 400 can operate as a typica page table operates but with the addition of the page encryption monitor bit 410 and the page encryption status bit 410. The hardware page table 400 allows an operating system to keep track of which virtual pages 430 point to which physical frames 440. Additionally, the hardware page table 400 can be in the form of various types of page tables. These forms include, but are not limited to, inverted page tables, multi-level page tables, virtualized page tables, and nested page tables.

It is noted that FIG. 4 is intended to depict the major representative components of a hardware page table 400. In some embodiments, however, individual components may have greater or lesser complexity than as represented in FIG. 4, components other than or in addition to those shown in FIG. 4 may be present, and the number, type, and configuration of such components may vary.

Figure 5:
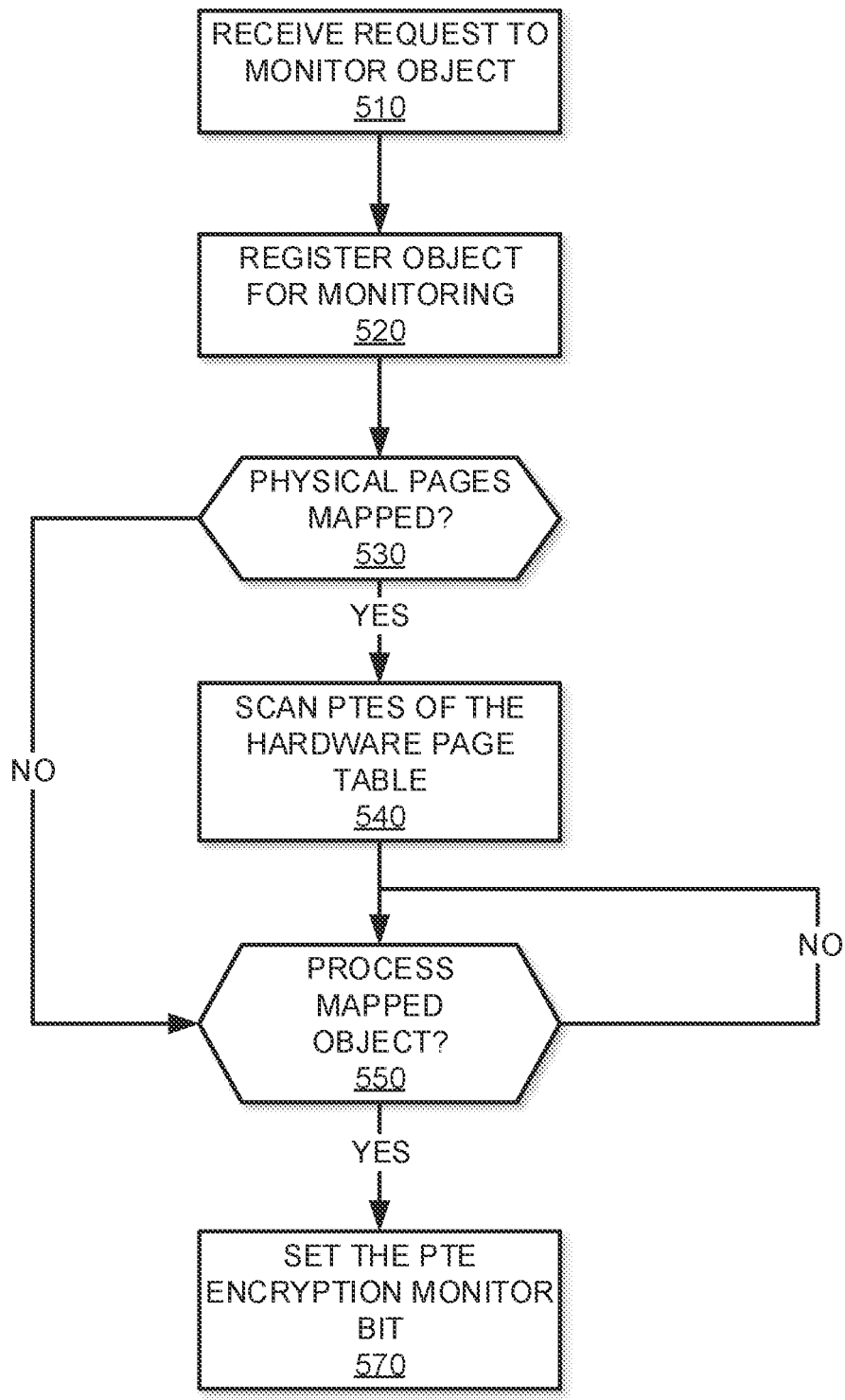
FIG. 5 is a flow diagram illustrating a process of setting the encryption monitor bits in the page table entries of a filesystem object.

FIG. 5 is a flow diagram illustrating a process 500 of setting encryption monitor bits in the page table entries of the hardware page table. The process 500 may be performed by hardware, firmware, software executing on a processor, or a combination thereof. For example, any or all the steps of the process 500 may be performed by one or more processors embedded in a computing device. A file monitor of the encryption mitigation system 100 receives a request for a filesystem object to be monitored for encryption activity. This is illustrated at step 510. The file monitor can register the filesystem object to set it for encryption monitoring. This is illustrated at step 520. The registration can be an internal indication to the encryption mitigation system 100 that the filesystem object is set for encryption monitoring.

A determination is made as to whether the marked filesystem object has any physical pages mapped in page table entries of the hardware page table 400. This is illustrated at step 530. Whenever a filesystem object is registered for encryption monitoring, the file monitor can check to see if the filesystem system object has any physical page frames already allocated to it. If physical page frames are already allocated to the filesystem object. The process 500 can proceed to step 540. However, if no physical frames are allocated to the filesystem object, the process 500 can proceed to step 550.

The file monitor scans the page table entries of the hardware page table to set the Page encryption monitor bit for each physical page belonging to the filesystem object. This is illustrated at step 540. The file monitor can intercept the mapping that maps the filesystem object's page frames to the address space of a user process. In some embodiments, the filesystem object can be mapped to a user process using the mmap( ) system call. The mmap( ) system call can identify an available address region in the process's address space and maps the filesystem object to that address region. The mmap( ) system call can also create a new mapping in the virtual address space of the calling process. The starting address for the new mapping is then specified an address entry.

The encryption monitoring system 100 monitors the filesystem object for when it is mapped into an address space. This is illustrated a step 550. If no mapping has occurred, the system 100 continuously monitors the marked filesystem object When a user process uses the address to read/write to the file, a page fault is incurred. An operating system page fault handler can then identify the physical page frame containing the filesystem object's contents and initialize the page table entry corresponding to the user process's address with the physical page frame 440. The file monitor can intercept the page fault handler and set the page encryption monitor bit 410. This is illustrated at step 570.

Multiple user processes can issue mmap( ) system calls to map a filesystem object into each of their address spaces. The result is that multiple page table entry mappings map the same physical page frame 440 number. This is known as page aliasing and requires additional steps by the file monitor to accurately set/reset the bits in the page table entries. An encryption monitor bit can be set for each of the virtual pages pointing to the same physical page frame when the page encryption monitor bit is already set for the page table entry the virtual pages are pointing to.

Figure 6:
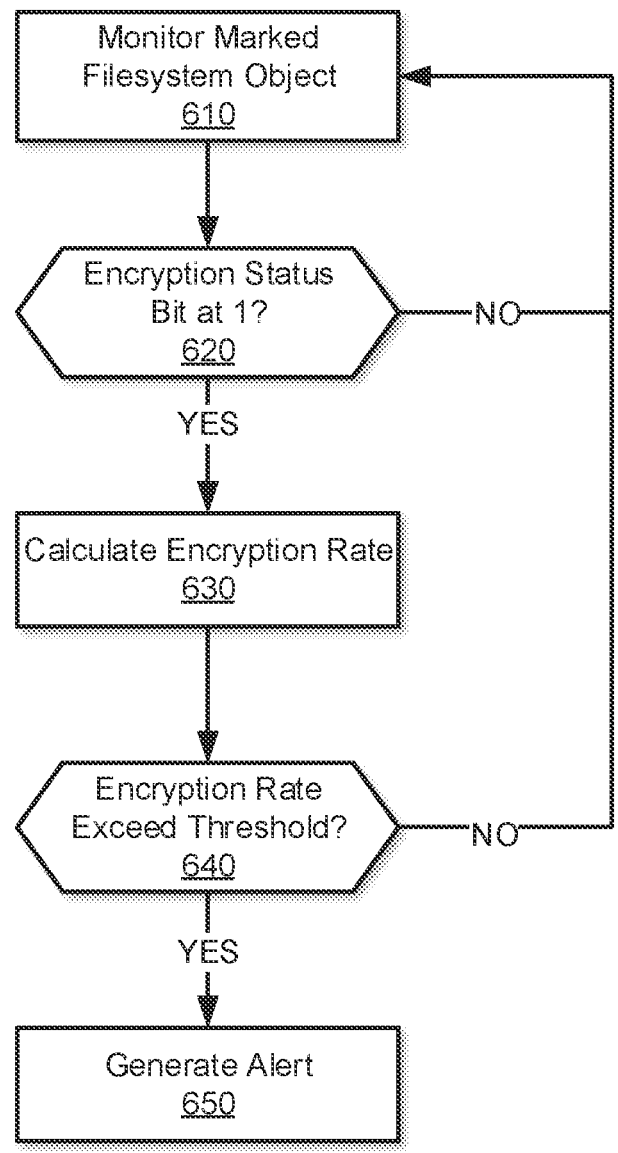
FIG. 6 is a flow diagram illustrating a process of detecting unauthorized encryptions and performed in accordance with embodiments of the present disclosure.

FIG. 6 is a flow diagram illustrating a process 600 of mitigating ransomware attacks, in accordance with embodiments of the present disclosure. The process 600 may be performed by hardware, firmware, software executing on a processor, or a combination thereof. For example, any or all the steps of the process 600 may be performed by one or more processors embedded in a computing device. The encryption monitor 130 monitors filesystem objects marked for ransomware protection. This is illustrated at step 610. The filesystem objects marked for ransomware protection can have the encryption monitor bits 410 of their corresponding page table entries in the hardware page table 400 set to '1' that indicates those entries are to be monitored.

The encryption monitor 130 can identify the page table entries corresponding to the marked filesystem objects in the hardware page table 400 for changes to the encryption status bits 420. This is illustrated at step 620. The PAGE encryption status bit 410 set to '1' can indicate that an encryption has occurred to the page represented by that page table entry. If no page encryption status bit 410 has been changed, the process 600 can return to monitoring the marked filesystem objects. However, if a page encryption status bit 410 is set to '1', then the process 600 proceeds to step 630.

The encryption mitigation system 100 stores a pre-encrypted version of the filesystem object corresponding to the page table entry in the hardware page table 400. The encryption mitigation system can copy the filesystem object into the data region 355 of the backup memory area 300. Additionally, the hash table 340 can be updated with information that includes the location of the page table entry and the backup pages 360 used to store the filesystem object.

The encryption rate calculator 140 can determine an encryption rate. This is illustrated at step 630. The encryption rate can signify how many pages are encrypted over a predetermined period of time. Typically, ransomware attacks attempt to encrypt large portions of data, while normal encryption habits may encrypt only a few filesystem objects at a time. As such, the more page table entries marked as being encrypted can be an indicator that a system is potentially under a ransomware attack. In some embodiments, the encryption rate calculator 140 can determine the encryption rate by adding up the total number of page table entries marked for monitoring and that have an encryption status bit set to '1'. That total can then be divided by a predetermined time. For example, 600 page table entries marked for monitoring and with encryption status bits 420 set at '1'. The predetermined time can be set at five seconds making the encryption rate 100.

In some embodiments, the encryption rate calculator 140 determines the encryption rate using the hash table 340 stored in the backup memory area 300. The hash table 340 can includes an encryption count memory pages of the filesystem objects. Whenever a memory page of the filesystem object is encrypted, its corresponding encryption count is incremented. The encryption rate calculator 140 can take the encryption count and divide by a predetermined time, similar to the technique describe above, and determine the encryption rate.

The encryption rate calculator 140 determines whether the encryption rate exceeds a predetermined encryption-rate threshold. This is illustrated at step 640. If the encryption rate does not exceed the encryption-rate threshold, then the process 600 can return to monitoring the marked filesystem objects. However, if the encryption rate exceeds the predetermined encryption-rate threshold, then an alert can be generated. This is illustrated at step 650. The generated alert can be set by an administrator upon initialization.

Figure 7:
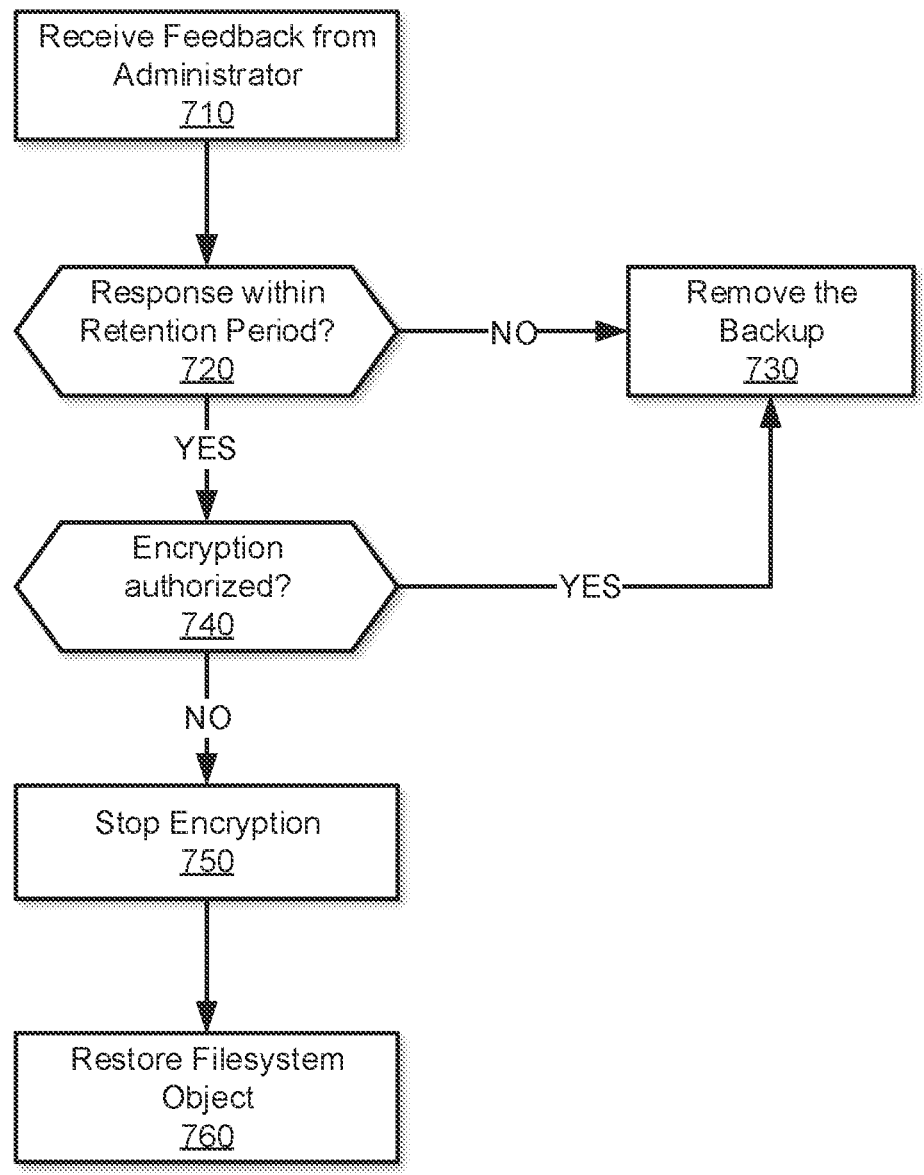
FIG. 7 is a flow diagram illustrating a process of response and mitigation of unauthorized encryptions and performed in accordance with embodiments of the present disclosure.

FIG. 7 is a flow diagram illustrating a process 700 of responding to an encryption alert, in accordance with embodiments of the present disclosure. The encryption mitigation system 100 receives feedback based on an alert of a potential ransomware attack. This is illustrated at step 710. The feedback can include instructions from an administrator as to how to respond to the alert. For example, the alert can be analyzed by an administrator and deemed an appropriate encryption has occurred. The feedback can also indicate that the encryption was inappropriate and mitigation efforts are required.

The feedback response is analyzed to determine whether the response is received within a data retention period. This is illustrated at step 720. In some embodiments, the pre-encrypted data stored in the backup memory area 300 is only maintained during a retention period. The pre-encrypted data is deleted after the retention period expires unless otherwise instructed. For example, the retention period can be one day, three days, one week, one month, and the like. If the feedback response is not received within the retention period, the pre-encrypted data has been deleted from the backup memory area and data recovery may not be possible. This is illustrated at step 730. However, if the feedback is received within the retention period, the process 700 proceeds to step 740.

The feedback is analyzed to determine whether the encryption was authorized or not. This is illustrated at step 740. In some embodiments, the feedback contains information from an administrator that has reviewed the encryption that has taken place and made a determination as to whether the encryption is authorized or not. For example, the administrator can analyze the encryption and determine that it was unauthorized and provide feedback to that effect. In some embodiments, the feedback is based on conditions that are set that allow for an automated response. For example, the system may have a condition that prevents any encryption occurring on filesystem objects marked for monitoring. If an encryption occurs, then the condition is met, and an automatic feedback response can be provided indicating that mitigation efforts are required. It should be noted that there can be any kind of conditions that can be set such that an automatic response can be used.

If the feedback response indicates that the encryption was authorized, then the pre-encrypted data stored on the backup memory area 300 can be deleted and no other steps are required. This is illustrated at step 730. However, if the feedback indicates that the encryption was not authorized, then the encryption mitigator 160 can attempt to stop any further encryption from occurring. This is illustrated at step 750. The encryption may have already been completed which would prevent the encryption mitigator 160 from stopping any encryption. However, if the encryption is still taking place, the encryption mitigator 160 can override the encryption command to prevent additional encryption from taking place.

The encryption mitigator 160 can analyze the filesystem objects that the hardware page table 400 marked as encrypted and restore those filesystem objects. This is illustrated at step 760. The encrypted, or partially encrypted, versions of the filesystem objects can be removed from the system and can be replaced with their corresponding pre-encrypted filesystem objects stored in the backup memory area 300. The encryption mitigator 160 can go through the hardware page table 400 and examine the encryption status bits 420 to determine which filesystem objects require replacement. For each filesystem object marked for encryption, the encryption mitigator 160 can identify the physical page frame numbers 440 allocated for the filesystem object. The encryption mitigator 160 identify the hash table 340 map entries that are mapped with the identified physical page frame numbers 440. If no mapping exists, then the filesystem object has not been encrypted. However, if a mapping exists in the hash table 340 to the identified physical page frame numbers 440, then the filesystem object can list the filesystem object as potentially being encrypted, and that it may indicate a ransomware attack on the object. In some embodiments, the feedback can provide the encryption mitigator with a list of filesystem objects to restore. For example, the feedback may indicate that only a certain number of filesystem objects require restoration. Alternatively, the feedback may list all the filesystem objects affected by the encryption.

Figure 8:
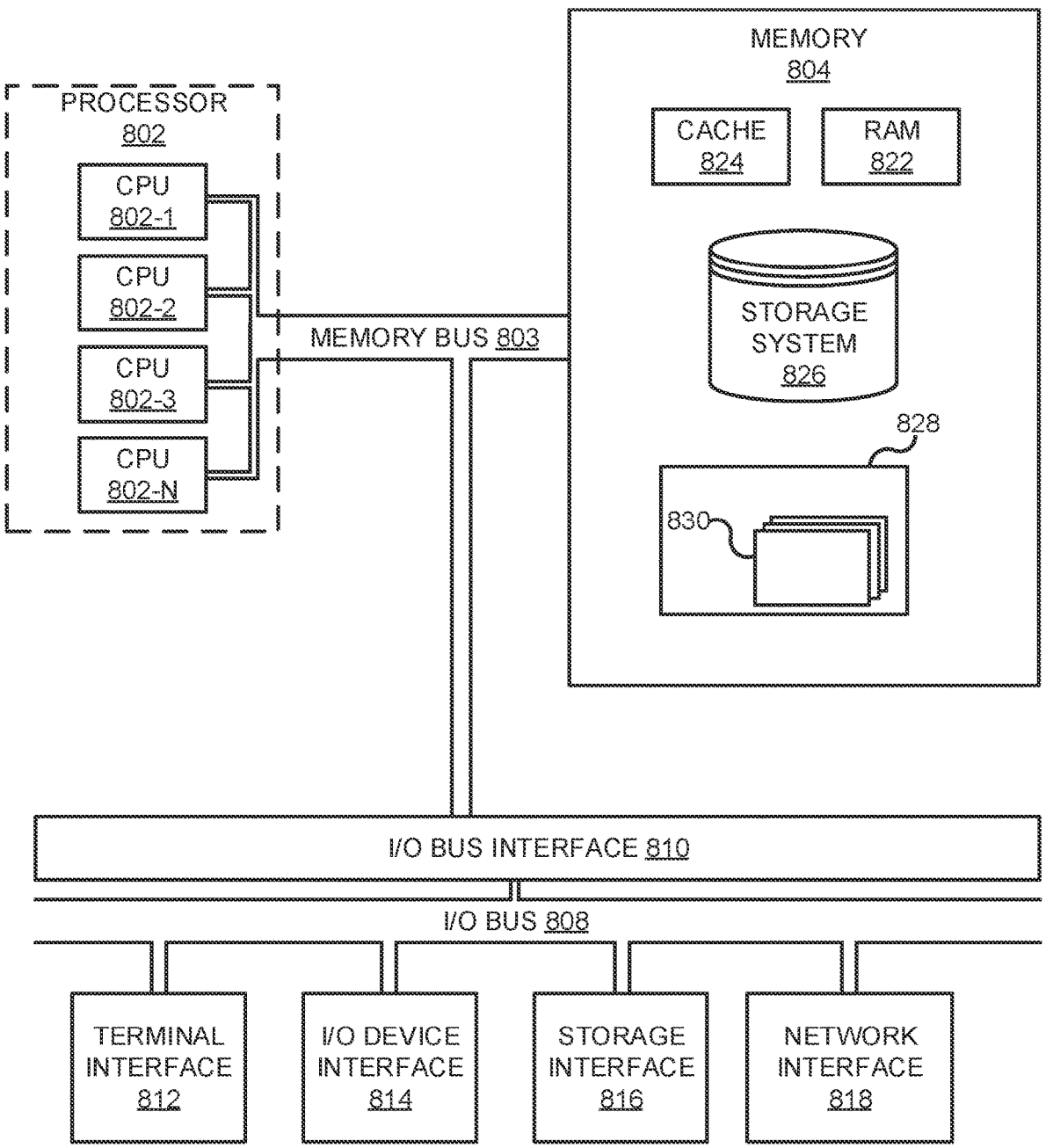
FIG. 8 is a high-level block diagram illustrating an example computer system that may be used in implementing one or more of the methods, tools, and modules, and any related functions, described herein in which the disclosure may be implemented.

Referring now to FIG. 8, shown is a high-level block diagram of an example computer system 800 (e.g., the encryption mitigation system 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 800 may comprise one or more processors 802, a memory 804, a terminal interface 812, an I/O (Input/Output) device interface 814, a storage interface 816, and a network interface 818, all of which may be communicatively coupled, directly or indirectly, for inter-component communication via a memory bus 803, an I/O bus 808, and an I/O bus interface 810.

The computer system 800 may contain one or more general-purpose programmable central processing units (CPUs) 802-1, 802-2, 802-3, and 802-N, herein generically referred to as the processor 802. In some embodiments, the computer system 800 may contain multiple processors typical of a relatively large system; however, in other embodiments, the computer system 800 may alternatively be a single CPU system. Each processor 802 may execute instructions stored in the memory 804 and may include one or more levels of onboard cache.

The memory 804 may include computer system readable media in the form of volatile memory, such as random-access memory (RAM) 822 or cache memory 824. Computer system 800 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

Although the memory bus 803 is shown in FIG. 8 as a single bus structure providing a direct communication path among the processors 802, the memory 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 800 may, in some embodiments, contain multiple I/O bus interface units, multiple I/O buses, or both. Further, while multiple I/O interface units are shown, which separate the I/O bus 808 from various communications paths running to the various I/O devices, in other embodiments, some or all of the I/O devices may be connected directly to one or more system I/O buses.

In some embodiments, the computer system 800 may be a multi-user mainframe computer system, a single-user system, or a server computer or similar device that has little or no direct user interface but receives requests from other computer systems (clients). Further, in some embodiments, the computer system 800 may be implemented as a desktop computer, portable computer, laptop or notebook computer, tablet computer, pocket computer, telephone, smartphone, network switches or routers, or any other appropriate type of electronic device.

It is noted that FIG. 8 is intended to depict the major representative components of an exemplary computer system 800. In some embodiments, however, individual components may have greater or lesser complexity than as represented in FIG. 8, components other than or in addition to those shown in FIG. 8 may be present, and the number, type, and configuration of such components may vary.

One or more programs/utilities 828, each having at least one set of program modules 830 (e.g., the encryption mitigation system 100), may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

The present disclosure may be a system, a method, and/or a computer program product at any possible technical detail level of integration. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of mitigating unauthorized encryptions, the computer-implemented method comprising:
    marking a filesystem object for encryption protection using an encryption monitor bit in a hardware page table;
    detecting an encryption occurring on the filesystem object, wherein the detecting comprises scanning one or more encryption status bits of one or more page table entries relating to the filesystem object;
    storing a pre-encrypted backup of the filesystem object for a predetermined amount of time in a backup memory area, wherein the backup memory area has a predetermined size based on a size of the filesystem object and the predetermined size of the backup memory area is adjusted dynamically if available space in the backup memory area reaches a predetermined percentage threshold;
    calculating, upon detecting the encryption, an encryption rate of the encryption;
    determining that the encryption rate of the filesystem object exceeds an encryption-rate threshold;
    generating an alert that the encryption rate of the filesystem object exceeds the encryption-rate threshold;
    receiving a feedback response, based on the alert, indicating that the encryption is unauthorized;
    performing mitigation techniques on the filesystem object; and
    analyzing the feedback response to determine whether the feedback response is received within a data retention period.

2. The computer-implemented method of claim 1, further comprising:
    stopping a progress of the encryption occurring on the filesystem object; and
    restoring the filesystem object using the pre-encrypted backup of the filesystem object stored in the backup memory area.

3. The computer-implemented method of claim 1, further comprising:
  resetting encryption status bits, from the one or more encryption status bits, on the hardware page table; and
  deleting the pre-encrypted backup of the filesystem object.

4. The computer-implemented method of claim 1, further comprising:
  determining the data retention period has passed relating to the pre-encrypted backup of the filesystem object; and
  deleting the pre-encrypted backup of the filesystem object.

5. The computer-implemented method of claim 1, wherein the storing the pre-encrypted backup of the filesystem object comprises:
  determining the backup memory area is unable to store the pre-encrypted backup of the filesystem object;
  generating a notice that the backup memory area is unable to store the pre-encrypted backup of the filesystem object; and
  performing an alleviation measure on the backup memory area, thereby providing space on the backup memory area to store the pre-encrypted backup of the filesystem object.

6. The computer-implemented method of claim 5, wherein the alleviation measure includes removing pre-encrypted objects still stored beyond their data retention period.

7. The computer-implemented method of claim 5, wherein the alleviation measure includes allocating additional memory to the backup memory area.

8. The computer-implemented method of claim 1, wherein the calculating the encryption rate of the filesystem object comprises:
  monitoring the one or more page table entries marked with the encryption monitor bit in the hardware page table;
  detecting a mark to an encryption status bit, from the one or more encryption status bits, of the one or more page table entries;
  counting a total of the one or more encryption status bits with marks; and
  determining the encryption rate by dividing the total over a predetermined period of time.

9. The computer-implemented method of claim 8, wherein the one or more page table entries marked with the encryption monitor bit include the encryption monitor bits of virtual pages pointing to the one or more page table entries of the hardware page table.

10. A computer program product including computer readable storage media of mitigating unauthorized encryptions, having computer executable instructions that when executed by at least one computer cause the at least one computer to execute the instructions to:
  mark a filesystem object for ransomware protection using an encryption monitor bit in a hardware page table;
  detect an encryption occurring to the filesystem object, wherein the detecting comprises scanning one or more encryption status bits of one or more page table entries relating to the filesystem object;
  store a pre-encrypted backup of the filesystem object for a predetermined amount of time in a backup memory area, wherein the backup memory area has a predetermined size based on a size of the filesystem object and the predetermined size of the backup memory area is adjusted dynamically if available space in the backup memory area reaches a predetermined percentage threshold;
  calculate, upon detecting the encryption, an encryption rate of the encryption;
  determine that the encryption rate of the filesystem object exceeds an encryption-rate threshold;
  generate an alert that the encryption rate of the filesystem object exceeds the encryption-rate threshold;
  receive a feedback response, based on the alert, indicating that the encryption is unauthorized;
  perform mitigation techniques on the filesystem object; and
  analyze the feedback response to determine whether the feedback response is received within a data retention period.

11. The computer program product of claim 10, further comprising instructions to:
  stop a progress of the encryption occurring on the filesystem object; and
  restore the filesystem object using the pre-encrypted backup of the filesystem object stored in the backup memory area.

12. The computer program product of claim 10, further comprising instructions to:
  reset encryption status bits, from the one or more encryption status bits, on the hardware page table; and
  delete the pre-encrypted backup of the filesystem object.

13. The computer program product of claim 10, further comprising instructions to:
  determine the data retention period has passed relating to the pre-encrypted backup of the filesystem object; and
  delete the pre-encrypted backup of the filesystem object.

14. The computer program product of claim 10, wherein the instruction to store the pre-encrypted backup of the filesystem object comprises instructions to:
  determine the backup memory area is unable store the pre-encrypted backup of the filesystem object;
  generate a notice that the backup memory area is unable to store the pre-encrypted backup of the filesystem object; and
  perform an alleviation measure on the backup memory area, thereby providing space on the backup memory area to store the pre-encrypted backup of the filesystem object.

15. The computer program product of claim 14, wherein the alleviation measure includes allocating additional memory to the backup memory area.

16. The computer program product of claim 10, wherein the instruction to calculate the encryption rate of the filesystem object comprises instructions to:
  monitor the one or more page table entries marked with the encryption monitor bit in the hardware page table;
  detect a mark to an encryption status bit, from the one or more encryption status bits, of the one or more page table entries;
  count a total of the one or more encryption status bits with marks; and
  determine the encryption rate by dividing the total over a predetermined period of time.

17. A system of mitigating ransomware attacks, the system comprising:
  a memory;
  a processor;
  local data storage having stored thereon computer executable code, wherein the computer executable code includes program instruction executable by the processor to cause the processor to perform a method;

an encryption monitor register configured to establish monitoring of filesystem objects and marking the filesystem objects for encryption protection, wherein the filesystem object is marked using page table entry encryption monitor bits;

a hardware page table to indicate page table entries of the filesystem objects marked for monitoring;

a backup memory area configured to store pre-encrypted versions of the filesystem objects, wherein the backup memory area has a predetermined size based on a size of the filesystem objects and the predetermined size of the backup memory area is adjusted dynamically if available space in the backup memory area reaches a predetermined percentage threshold, and the backup memory area includes a retention period;

an encryption monitor configured to detect encryptions performed on the filesystem objects, wherein the detecting comprises scanning encryption status bits of the page table entries relating to the filesystem objects marked for encryption protection;

an encryption rate calculator configured to calculate encryption rates of the encryptions;

an alerting mechanism for providing alerts for unauthorized encryptions; and an encryption mitigator configured to receive a feedback response indicating that an encryption of the filesystem objects was unauthorized and to perform mitigation techniques on the filesystem objects, wherein the feedback response is analyzed to determine whether the feedback response is received within a data retention period.

18. The system of claim 17, wherein the backup memory area includes the data retention period for the pre-encrypted versions of the filesystem objects.

19. The system of claim 17, wherein the alerting mechanism generates an alert upon determining an encryption rate exceeds an encryption-rate threshold.

20. The system of claim 17, wherein the encryption mitigator is configured to replace the encryptions performed on the filesystem objects with the pre-encrypted versions of the filesystem objects.

* * * * *